United States Patent
Nurmi et al.

(10) Patent No.: US 11,879,095 B2
(45) Date of Patent: Jan. 23, 2024

(54) CHARGE DEVELOPING POLYMER COMPOSITIONS AND METHODS OF USE FOR FOR ENHANCED OIL RECOVERY

(71) Applicant: KEMIRA OYJ, Helsinki (FI)

(72) Inventors: Leena Nurmi, Espoo (FI); Sirkku Hanski, Helsinki (FI); Susanna Toivonen, Helsinki (FI); Louis Rosati, Atlanta, GA (US)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 17/276,843

(22) PCT Filed: Sep. 17, 2019

(86) PCT No.: PCT/US2019/051536
§ 371 (c)(1),
(2) Date: Mar. 17, 2021

(87) PCT Pub. No.: WO2020/061063
PCT Pub. Date: Mar. 26, 2020

(65) Prior Publication Data
US 2021/0348049 A1    Nov. 11, 2021

Related U.S. Application Data

(60) Provisional application No. 62/732,386, filed on Sep. 17, 2018.

(51) Int. Cl.
*E21B 43/16* (2006.01)
*C09K 8/588* (2006.01)

(52) U.S. Cl.
CPC .............. *C09K 8/588* (2013.01); *E21B 43/16* (2013.01)

(58) Field of Classification Search
CPC .................................. C09K 8/588; E21B 43/16
See application file for complete search history.

(56) References Cited

U.S. PATENT DOCUMENTS

| | | | | |
|---|---|---|---|---|
| 5,725,779 A | * | 3/1998 | Mallon | D21C 9/005 210/728 |
| 5,733,462 A | * | 3/1998 | Mallon | C02F 11/148 210/728 |
| 2007/0062697 A1 | * | 3/2007 | Barbosa | C09K 8/501 166/263 |
| 2011/0053251 A1 | | 3/2011 | Birkner et al. | |
| 2011/0268779 A1 | | 11/2011 | Canham et al. | |
| 2014/0209304 A1 | | 7/2014 | Reed et al. | |
| 2016/0032170 A1 | * | 2/2016 | Li | C09K 8/584 166/305.1 |
| 2016/0200963 A1 | * | 7/2016 | Reed | C09K 8/588 166/305.1 |

FOREIGN PATENT DOCUMENTS

| | | |
|---|---|---|
| WO | 2009/131967 | 10/2009 |
| WO | 2010/138207 | 12/2010 |

OTHER PUBLICATIONS

Kamel et al. "Preparation and evaluation of nanoporous-pyramids structured silicon powder as an effective photocatalyst for degradation of methyl red." Int. J. Environ. Sci. Technol., Nov. 23, 2017, vol. 16, pp. 2101-2108.
Zhao et al. "Hierarchical micro/nano porous silicon Li-ion battery anodes." Chemical Communications. 2012;48 (42):5079-81.
Han et al. "Metal-assisted chemical etching of silicon and nanotechnology applications." Nano today. Jun. 1, 2014;9 (3):271-304.
Levitt DB, Pope GA, Jouenne S. Chemical degradation of polyacrylamide polymers under alkaline conditions. SPE Reservoir Evaluation & Engineering. Jun. 7, 2011;14(03):281-6.

* cited by examiner

*Primary Examiner* — Silvana C Runyan
(74) *Attorney, Agent, or Firm* — Robin L. Teskin; Baker, Donelson, Bearman, Caldwell & Berkowitz PC

(57) ABSTRACT

The present embodiments generally relate to methods and compositions comprising one or more polymers which gradually increase in charge, thereby providing for an increase in viscosity in an aqueous solution or aqueous composition, such as when present in a desired aqueous environment. Use of such compositions and methods comprising one or more polymers which gradually increase in charge, thereby providing for an increase in viscosity in an aqueous solution or aqueous composition during enhanced oil recovery may result in an increase in oil production relative to methods and/or compositions which do not comprise one or more polymers which gradually increase in charge, thereby providing for an increase in viscosity in an aqueous solution or aqueous composition.

8 Claims, 7 Drawing Sheets

CHARGE DEVELOPING POLYMER COMPOSITIONS AND METHODS OF USE FOR FOR ENHANCED OIL RECOVERY

RELATED APPLICATIONS

This application is a U.S. National Phase application of Int'l Appl. No. PCT/US2019/051536, filed Sep. 17, 2019, which claims priority to U.S. Provisional Appl. No. 62/732,386, filed Sep. 17, 2018, each of which are incorporated herein by reference in their entireties.

FIELD OF THE ART

The present disclosure generally relates to methods and compositions comprising one or more polymers which gradually increase in charge, thereby providing for an increase in viscosity when present in a desired aqueous solution or aqueous composition, e.g., that comprised in an aqueous environment such as sea water or brine. Said one or more polymers may be used during enhanced oil recovery, e.g., chemical enhanced oil recovery.

BACKGROUND

Enhanced oil recovery (EOR) is a technique that can be used to increase the amount of unrefined petroleum (e.g., crude oil) that may be extracted from an oil reservoir (e.g., an oil field). By way of example, using EOR, about 40-60% of the reservoir's original oil can typically be extracted, compared with only 20-40% using traditional primary and secondary recovery techniques (e.g., by water injection or natural gas injection). One type of EOR technique is polymer flooding, which typically involves the injection of large volumes of a polymer solution into a subterranean oil reservoir. The polymer solution can mobilize the oil towards a production well where it can be recovered. The polymer(s) used for the polymer flooding may impact the viscosity and viscoelastic properties of the solution that is injected into a reservoir. Further development of polymers and solutions comprising for use in methods of EOR are highly desirable in the industry.

BRIEF SUMMARY

The present disclosure generally relates to a method of gradually increasing the viscosity in a desired aqueous environment which method comprises introducing one or more polymers into said desired aqueous environment, which one or more polymers when introduced into said desired aqueous environment comprise low charge or no charge, and further comprise labile monomer units, wherein said one or more polymers when present for prolonged duration in the desired aqueous environment gradually increase in charge, thereby providing for an increase in viscosity in said aqueous environment as a result of the labile monomer units in said one or more polymers being broken or hydrolyzed in the desired aqueous environment. In some embodiments, said aqueous environment may contain inorganic salts. In some embodiments, said desired aqueous environment may comprise sea water, brine or other salinated water, e.g., water having a salinity ranging from about 1 part to about 150 parts per thousand, e.g., about 35 parts per thousand, and having a temperature of about 55-140° C., e.g., about 58° C. In some embodiments, the initial anionic charge of at least one of the one or more polymers may be less than 25 mole percent, such as wherein the initial content of anionic monomers is less than 25 mole percent. In some embodiments, at least one of said one or more polymers may contain 1-100 mole percent of labile monomer units which gradually break or hydrolyze in the desired aqueous environment, and, optionally, wherein said breaking or hydrolysis of said labile monomer units may result in a gradual increase in anionic charge and viscosity in the aqueous environment. In some embodiments, the initial anionic charge of at least one of the one or more polymers may be 100 mole percent, such as wherein the initial content of anionic monomers is 100 mole percent. In some embodiments, at least one of said one or more polymers may contain 1-100 mole percent of acrylamide. In some embodiments, at least one of said one or more polymers may not be cross-linked when introduced into the aqueous environment. In some embodiments, at least one of said one or more polymers may not be cross-linked when introduced into the aqueous environment and further do not become cross-linked in the aqueous environment. In some embodiments, the desired aqueous environment may comprise an oil containing aqueous environment. In some embodiments, the desired aqueous environment may comprise an oil or gas reservoir. In some embodiments, said method may comprise introducing into an oil or gas reservoir a polymer flood comprising said one or more polymers which provides for an increase in oil or gas recovery from said oil or gas reservoir.

In some embodiments, at least one of said one or more polymers which gradually increase in charge, thereby providing for an increase in viscosity in an aqueous solution or aqueous composition, when present in the desired aqueous environment, may comprise acrylamide monomers or acrylamide-type monomers. In some embodiments, said one or more polymers which gradually increase in charge, thereby providing for an increase in viscosity in an aqueous solution or aqueous composition, when present in the desired aqueous environment, may comprise anionic monomers. In some embodiments, at least one of said one or more polymers which gradually increase in charge, thereby providing for an increase in viscosity in an aqueous solution or aqueous composition, when present in the desired aqueous environment, may comprise acrylic acid. In some embodiments, at least one of said one or more polymers which gradually increase in charge, thereby providing for an increase in viscosity in an aqueous solution or aqueous composition, when present in the desired aqueous environment, may comprise acrylamide tertiary butyl sulfonic acid ("ATBS"). In some embodiments, at least one of said one or more polymers which gradually increase in charge, thereby providing for an increase in viscosity in an aqueous solution or aqueous composition, when present in the desired aqueous environment, may comprise acrylamide monomers and acrylic acid monomers. In some embodiments, at least one of said one or more polymers which gradually increase in charge, thereby providing for an increase in viscosity in an aqueous solution or aqueous composition, when present in the desired aqueous environment, may comprise acrylamide monomers and ATBS monomers. In some embodiments, at least one of said one or more polymers which gradually increase in charge, thereby providing for an increase in viscosity in an aqueous solution or aqueous composition, when present in the desired aqueous environment, may comprise sulfonated PAM. In some embodiments, at least one of said one or more polymers which gradually increase in charge, thereby providing for an increase in viscosity in an aqueous solution or aqueous composition, when present in the desired aqueous environment, may comprise one or more sulfonic acid monomers, e.g., one or more ATBS, vinylsulfonic acid; 4-styrenesulfonic acid; and any salts of any of the aforementioned monomers.

In some embodiments, at least one of said one or more polymers which gradually increase in charge, may provide for an increase in viscosity in an aqueous solution or aqueous composition in the desired aqueous environment may comprise 1% or less, 2.5% or less, 5.0% or less, 7.5% or less, 10% or less, 12.5% or less, 15.0% or less, 17.5% or less, 20% or less, 22.5% or less, 25.0% or less, 27.5% or less, 30.0% or less, 35.0% or less, 40.0% or less, 45.0% or less, 50.0% or less, 55.0% or less, 60.0% or less, 65.0% or less, 70.0% or less, 75.0% or less, 80.0% or less, 85.0% or less, 90.0% or less, 95.0% or less, 99.0% or less, 99.0% or more, or 100% charge prior to said polymer flood. In some embodiments, the introduction of said one or more polymers which gradually increase in charge, thereby providing for an increase in viscosity in an aqueous solution or aqueous composition in the desired aqueous environment may result in an increase in viscosity by about 1% or less, 1% or more, 5% or more, 10% or more, 15% or more, 20% or more, 25% or more, 30% or more, 35% or more, 40% or more, or 45% or more after the onset of polymer flooding. In some embodiments, said method may result in a 1% increase or less, 1% increase or more, 2% increase or more, a 3% increase or more, a 5% increase or more, a 5.0% increase or more, a 6% increase or more, a 7% increase or more, an 8% increase or more, a 9% increase or more, a 10% increase or more, an 11% increase or more, a 12% increase or more, a 13% increase or more, a 14% increase or more, or 15% increase or more in oil production as compared to a method of EOR not comprising use of said one or more polymers which gradually increase in charge, thereby providing for an increase in viscosity in an aqueous solution or aqueous composition.

Moreover, the present disclosure generally relates to a method of enhanced oil recovery comprising the use of one or more polymers which gradually increase in charge, thereby providing for an increase in viscosity in an aqueous solution or aqueous composition when present in an oil containing aqueous environment, wherein said method comprises: (i) obtaining or providing a composition comprising one or more polymers which gradually increase in charge, thereby providing for an increase in viscosity in an aqueous solution or aqueous composition when present in the desired aqueous environment, such as those described herein; (ii) placing the composition in a subterranean formation downhole; and (iii) extracting material comprising petroleum from the subterranean formation downhole via a production wellbore. Furthermore, the present disclosure generally encompasses a method of enhanced oil recovery comprising the use of one or more polymers which gradually increase in charge, thereby providing for an increase in viscosity in an aqueous solution or aqueous composition when present in an oil containing aqueous environment, wherein said method comprises: (i) obtaining or providing a composition comprising one or more polymers which gradually increase in charge, thereby providing for an increase in viscosity in an aqueous solution or aqueous composition when present in an oil containing aqueous environment; (ii) placing the composition in a subterranean formation downhole; and (iii) extracting material comprising petroleum from the subterranean formation downhole via a production wellbore. The present disclosure also generally relates to a method of enhanced oil recovery comprising the use of one or more polymers which gradually increase in charge, thereby providing for an increase in viscosity in an aqueous solution or aqueous composition when present in an oil containing aqueous environment, wherein said method comprises placing said one or more polymers which gradually increase in charge, thereby providing for an increase in viscosity in an aqueous solution or aqueous composition when present in an oil containing aqueous environment into a subterranean formation downhole which comprises placing the one or more polymers in a producing zone downhole, and wherein extraction of material comprising petroleum from the subterranean formation downhole comprises extracting of the material from the producing zone.

Moreover, the present disclosure generally relates to a composition suitable for use in enhanced oil recovery, wherein said composition comprises one or more polymers which gradually increase in charge, thereby providing for an increase in viscosity in an aqueous solution or aqueous composition when present in an oil containing aqueous environment and an aqueous fluid. In some embodiments, said composition may be suitable for use in polymer flooding. In some embodiments, at least one of said one or more polymers which gradually increase in charge, thereby providing for an increase in viscosity in an aqueous solution or aqueous composition when present in an oil containing aqueous environment may comprise acrylamide monomers or acrylamide-type monomers. In some embodiments, at least one of said one or more polymers which gradually increase in charge, thereby providing for an increase in viscosity in an aqueous solution or aqueous composition when present in an oil containing aqueous environment may comprise anionic monomers. In some embodiments, at least one of said one or more polymers which gradually increase in charge, thereby providing for an increase in viscosity in an aqueous solution or aqueous composition when present in an oil containing aqueous environment may comprise acrylic acid. In some embodiments, at least one or more polymers which gradually increase in charge, thereby providing for an increase in viscosity in an aqueous solution or aqueous composition when present in an oil containing aqueous environment may comprise ATBS. In some embodiments, at least one of said one or more polymers which gradually increase in charge, thereby providing for an increase in viscosity in an aqueous solution or aqueous composition when present in an oil containing aqueous environment may comprise acrylamide monomers and anionic monomers. In some embodiments, at least one of said one or more polymers which gradually increase in charge, thereby providing for an increase in viscosity in an aqueous solution or aqueous composition when present in an oil containing aqueous environment may comprise acrylamide monomers acrylic and acid monomers. In some embodiments, at least one of said one or more polymers which gradually increase in charge, thereby providing for an increase in viscosity in an aqueous solution or aqueous composition when present in an oil containing aqueous environment may comprise acrylamide monomers and ATBS monomers. In some embodiments, at least one of said one or more polymers which gradually increase in charge, thereby providing for an increase in viscosity in an aqueous solution or aqueous composition when present in an oil containing aqueous environment may comprise sulfonated PAM. In some embodiments, at least one of said one or more polymers which gradually increase in charge, thereby providing for an increase in viscosity in an aqueous solution or aqueous composition when present in an oil containing aqueous environment may comprise one or more sulfonic acid monomers, e.g., one or more ATBS, vinylsulfonic acid; 4-styrenesulfonic acid; and any salts of any of the aforementioned monomers.

In some embodiments, said composition comprises a greater viscosity as compared to the viscosity of a composition that does not comprise said one or more polymers which gradually increase in charge, may provide for an increase in viscosity in a desired aqueous solution or aqueous composition.

BRIEF DESCRIPTION OF THE SEVERAL VIEWS OF THE DRAWING

FIG. 1A illustrates viscosity measurements that were taken during the aging experiment, and FIG. 1B illustrates acrylic acid content measurements that were taken during the aging experiment, in accordance with Example 1.

FIG. 2A illustrates viscosity measurements that were taken during the aging experiment, and FIG. 2B illustrates acrylic acid content measurements that were taken during the aging experiment, in accordance with Example 1.

FIG. 3A illustrates viscosity measurements that were taken during the aging experiment, and FIG. 3B illustrates acrylic acid content measurements that were taken during the aging experiment, in accordance with Example 2.

DETAILED DESCRIPTION

Definitions

Figure 1A:
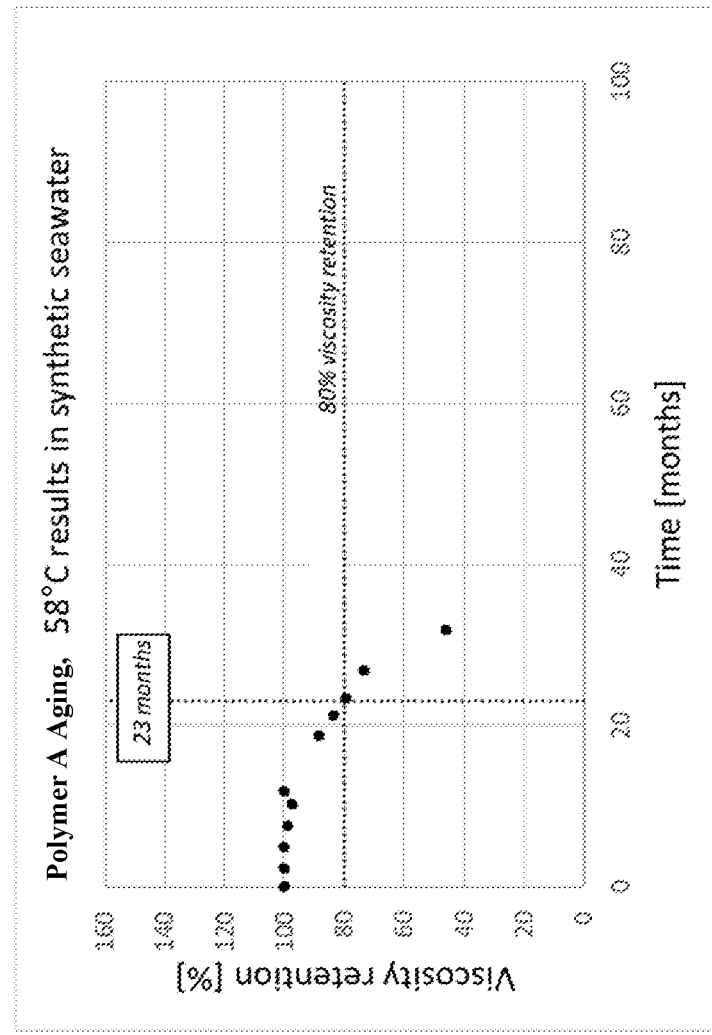
FIG. 1A and FIG. 1B illustrate the aging of a polymer in accordance with Example 1.

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "enhanced oil recovery" or "EOR" (sometimes also known as improved oil recovery ("IOR") or tertiary mineral oil production) generally refers to techniques for increasing the amount of unrefined petroleum (for example, crude oil) that may be extracted from an oil reservoir, such as an oil field. Examples of EOR techniques include, for example, miscible gas injection (e.g., carbon dioxide flooding), chemical injection, which is sometimes referred to as chemical enhanced oil recovery ("CEOR"), and which includes, for example, polymer flooding, alkaline flooding, surfactant flooding, micellar polymer flooding, conformance control operations, as well as combinations thereof such as alkaline-polymer flooding or alkaline-surfactant-polymer flooding, microbial injection, and thermal recovery (e.g., cyclic steam, steam flooding, or fire flooding). In some embodiments, the EOR operation may include a polymer ("P") flooding operation, an alkaline-polymer ("AP") flooding operation, a surfactant-polymer ("SP") flooding operation, an alkaline-surfactant-polymer ("ASP") flooding operation, a conformance control operation, or any combination thereof.

As used herein, the terms "polymer flood" or "polymer flooding" generally refer to a chemical enhanced EOR technique that typically involves injecting an aqueous fluid that is viscosified with one or more water-soluble polymers through injection boreholes into an oil reservoir to mobilize oil left behind after primary and/or secondary recovery. As a general result of the injection of one or more polymers, the oil may be forced in the direction of the production borehole, and the oil may be produced through the production borehole. Details of examples of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010", which is herein incorporated by reference in its entirety. One or more surfactants may be injected (or formed in situ) as part of the EOR technique. Surfactants may function to reduce the interfacial tension between the oil and water, which may reduce capillary pressure and improve mobilization of oil. Surfactants may be injected with polymers (e.g., a surfactant-polymer (SP) flood), or formed in-situ (e.g., an alkaline-polymer (AP) flood), or a combination thereof (e.g., an alkaline-surfactant-polymer (ASP) flood). As used herein, the terms "polymer flood" and "polymer flooding" encompass all of these EOR techniques.

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge. Nonionic monomers may comprise but are not limited to comprising monomers selected from the group consisting of acrylamide ("AMD"), acrylic, methacrylic, methacrylamido, vinyl, allyl, ethyl, and the like, all of which may be substituted with a side chain selected from, for example, an alkyl, arylalkyl, dialkyl, ethoxyl, and/or hydrophobic group. In some embodiments, a nonionic monomer may comprise AMD. In some embodiments, nonionic monomers may comprise but are not limited to comprising vinyl amide (e.g., acrylamide, methacrylamide, N-methylacrylamide, N,N-dimethylacrylamide), acryloylmorpholine, acrylate, maleic anhydride, N-vinylpyrrolidone, vinyl acetate, N-vinyl formamide and their derivatives, such as hydroxyethyl (methyl) acrylate CH2=CR—COO—CH2CH2OH (I) and CH2=CR—CO—N(Z1)(Z2) (2) N-substituted (methyl) acrylamide (II). R=H or Me; Z1=5-15C alkyl; 1-3C alkyl substituted by 1-3 phenyl, phenyl or 6-12C cycloalkyl (both optionally substituted) and Z2=H; or Z1 and Z2 are each 3-10C alkyl; (II) is N-tert. hexyl, tert. octyl, methylundecyl, cyclohexyl, benzyl, diphenylmethyl or triphenyl acrylamide. Nonionic monomers further may include dimethylaminoethylacrylate ("DMAEMA"), dimethylaminoethyl methacrylate ("DMAEM"), N-isopropylacrylamide and N-vinyl formamide. Nonionic monomers can be combined, for example to form a terpolymer of acrylamide, N-vinyl formamide, and acrylic acid.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

Examples of anionic monomers which may be used herein which further may be substituted with other groups include but are not limited to those comprising acrylamide ("AMD"), acrylic, methacrylic, methacrylamido, vinyl, allyl, ethyl, and the like; maleic monomers and the like; calcium diacrylate; and/or any monomer substituted with a carboxylic acid group or salt thereof. In some embodiments, these anionic monomers may be substituted with a carboxylic acid group, and include, for example, acrylic acid, and methacrylic acid. In some embodiments, an anionic monomer which may be used herein may be a (meth)acrylamide monomer wherein the amide group has been hydrolyzed to a carboxyl group. Said monomer may be a derivative or salt of a monomer according to the embodiments. Additional examples of anionic monomers comprise but are not limited to those comprising sulfonic acids or a sulfonic acid group, or both. In some embodiments, the anionic monomers which may be used herein may comprise a sulfonic function that may comprise, for example, acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and/or any salts of any of these moieties/monomers. In some embodiments, anionic monomers may comprise organic acids. In some embodiments, anionic monomers may comprise acrylic acid, methacrylic acid, maleic acid, itaconic acid, acrylamido methylpropane sulfonic acid, vinylphosphonic acid, styrene sulfonic acid and their salts such as sodium, ammonium and potassium. Anionic monomers can be combined, for example, to form a terpolymer of acrylamide, acrylic acid and 2-acrylamido-2-methylpropane sulfonic acid.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6, Q6o 4, and/or diallyldimethylammonium chloride ("DADMAC").

Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers may comprise but are not limited to comprising monomers selected from the group consisting of dimethylaminoethylacrylate methyl chloride quaternary salt, dimethylaminoethylmethacrylate methyl chloride quaternary salt, and diallyldimethyl ammonium chloride. Cationic monomers can be combined, for example, to form a terpolymer of dimethylaminoethylmethacrylate methyl chloride quaternary salt, and diallyldimethyl ammonium chloride and acrylamide.

The term "water-soluble polymer" generally refers to any polymer that may dissolve, disperse, or swell in water. Said polymers may modify the physical properties of aqueous systems undergoing gellation, thickening, viscosification, or emulsification/stabilization. Said polymers may perform a variety of functions, including but not limited to use as dispersing and suspending agents, stabilizers, thickeners, viscosifiers, gellants, flocculants and coagulants, film-formers, humectants, binders, and lubricants.

In the context of polymer flooding, a water-soluble polymer may include, but not be limited to including, one or acrylamide-based polymers and/or copolymers of acrylamide and further monomers, for example, vinylsulfonic acid or acrylic acid. Polyacrylamide may be partly hydrolyzed polyacrylamide ("HPAM"), in which some of the acrylamide units have been hydrolyzed to acrylic acid. In some instances, a water soluble polymer may comprise a sulfonated polyacrylamide. In some embodiments, one or more acrylamide (co)polymers may be a polymer useful for enhanced oil recovery (EOR) applications.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. Furthermore, PAMs may comprise any of the polymers or copolymers discussed herein. In some embodiments, PAMS may comprise sulfonated PAM, such as, for example, copolymers of acrylamide and acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and/or any salts of any of these moieties/monomers. Additionally, the PAMs described herein, e.g., one or more acrylamide (co)polymers, may be provided in one of various forms, including, for example, dry (powder) form (e.g., DPAM), water-in-oil emulsion (inverse emulsion), suspension, dispersion, or partly hydrolyzed (e.g., HPAM, in which some of the acrylamide units have been hydrolyzed to acrylic acid). In some embodiments, PAMs, e.g., one or more acrylamide (co)polymers, may be used for polymer flooding. In some embodiments, PAMS, e.g., one or more acrylamide (co)polymers, may be used in any EOR technique.

As used herein, the terms "sulfonated polyacrylamide" or "sulfonated PAM" generally refer to polyacrylamide polymers or PAMs as above-defined which comprise one or more sulfonic acid moieties, e.g., one or more sulfonic acid monomers. Examples thereof include acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and any salts of any of these moieties/monomers.

As used herein, the terms "polymer which gradually increases in charge, thereby providing for an increase in viscosity in an aqueous solution or aqueous composition present in a desired aqueous environment", "polymer which gradually increases in charge, thereby providing for an increase in viscosity in an aqueous solution", "polymer which gradually increases in charge, thereby providing for an increase in viscosity in an aqueous composition", and the like, generally refer to a polymer and/or a composition and/or a solution comprising a polymer in which the charge of said polymer increases relative to its initial value and/or the viscosity of an aqueous composition and/or aqueous solution comprising said one or more polymers increases in viscosity relative to its initial value, i.e., as a result of said increase in charge of said one or more polymers. In some embodiments, such polymer may be used to effect a gradual increase in the viscosity of a desired aqueous environment, e.g., sea water, brine, or other salinated aqueous composition. Said gradual increase may be effected, for example, by a method which may comprise introducing one or more polymers, e.g., one or more polymers which gradually increase in charge, thereby providing for an increase in viscosity in an aqueous solution and/or an aqueous composition, into said desired aqueous environment, which one or more polymers when introduced into said desired aqueous environment comprise low charge and low viscosity and further comprise labile monomer units, wherein said one or more polymers when present for prolonged duration in the desired aqueous environment gradually increase in charge, e.g., an increase in anionic charge, and the solution thereby increases in viscosity as a result of the labile monomer units in said one or more polymers being broken or hydrolyzed in the desired aqueous environment. In some embodiments, said aqueous environment may be an oil containing aqueous environment. Furthermore, a polymer which gradually increases in charge, thereby providing for an increase in viscosity in an aqueous solution or aqueous composition, may be comprised by a solution for use in polymer flooding, and the viscosity of solution comprising may have a higher viscosity value following an injection to effect a polymer flood as compared to the initial viscosity value of solution comprising prior to injection of the polymer and/or polymer solution for effecting a polymer flood. In some embodiments, a polymer which gradually increases in charge, thereby providing for an increase in viscosity of a desired aqueous composition may comprise a water soluble polymer, wherein said water soluble polymer comprises labile monomer units comprising bonds that may be broken, and wherein breaking of said bonds may result in an increase in anionic charge. In some embodiments, a polymer which gradually increases in charge, thereby providing for an increase in viscosity of a desired aqueous composition may comprise acrylamide monomers. In some embodiments, a polymer which gradually increases in charge, thereby providing for an increase in viscosity of a desired aqueous composition may comprise anionic monomers, such as acrylic acid monomers. In some embodiments, a polymer which gradually increases in charge, thereby providing for an increase in viscosity of a desired aqueous composition may comprise ATBS. In some embodiments, a polymer which gradually increases in charge may comprise one or more sulfonic acid moieties/monomers, such as ATBS, vinylsulfonic acid; 4-styrenesulfonic acid; and any salts of any of these moieties/monomers. In some embodiments, a polymer which gradually increases in charge, thereby providing for an increase in viscosity of a desired aqueous composition may comprise acrylamide monomers and anionic monomers. In some embodiments, a polymer which gradually increases in charge, thereby providing for an increase in viscosity in an aqueous solution or aqueous composition may comprise acrylamide monomers and acrylic acid monomers. In some embodiments, a polymer which gradually increases in charge, thereby providing for an increase in viscosity in an aqueous solution or aqueous composition may comprise acrylamide monomers and ATBS monomers. In some embodiments, a polymer which gradually increases in charge, thereby providing for an increase in viscosity of a desired aqueous composition may comprise acrylamide and/or acrylic acid. In some embodiments, the percentage of acrylamide in a polymer which gradually increases in charge, thereby providing for an increase in viscosity of a desired aqueous composition comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, the percentage of acrylic acid in a polymer which gradually increases in charge, thereby providing for an increase in viscosity of a desired aqueous composition comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, a polymer which gradually increases in charge, thereby providing for an increase in viscosity of a desired aqueous composition may comprise acrylic acid, and the percentage of acrylic acid in the polymer comprises 30 mol % or less, 25 mol % or less, 20 mol % or less, 15 mol % or less, 10 mol % or less, 5 mol % or less, or mol 1% or less. In some embodiments, a polymer which gradually increases in charge, thereby providing for an increase in viscosity of a desired aqueous composition may comprise sulfonated PAM, e.g., a polymer comprising one or more sulfonic acid moieties and/or monomers and one or more acrylamide-based monomers, such as one or more nonionic and/or one or more anionic acrylamide monomers. In some embodiments, a polymer which gradually increases in charge, thereby providing for an increase in viscosity of a desired aqueous composition may comprise acrylamide and ATBS. In some embodiments, the percentage of acrylamide in the polymer which gradually increases in charge, thereby providing for an increase in viscosity of a desired aqueous composition comprises 1% or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, or 99 mol % or more. In some embodiments, the percentage of ATBS in said polymer comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, a polymer which gradually increases in charge, thereby providing for an increase in viscosity of a desired aqueous composition may comprise 5 mol % acrylic acid and 95 mol % acrylamide. In some embodiments, a polymer which gradually increases in charge, thereby providing for an increase in viscosity of a desired aqueous composition may comprise 15 mol % ATBS and 85 mol % acrylamide. In some embodiments, a polymer w which gradually increases in charge, thereby providing for an increase in viscosity of a desired aqueous composition may comprise 1 mol % or less, 1 mol % or more, 10 mol % or more, 25 mol % or more, 50 mol % or more, 75 mol % or more, 99 mol % or more, or 100 mol % of labile monomer units. In some embodiments, a polymer which gradually increases in charge, thereby providing for an increase in viscosity of a desired aqueous composition may comprise a polyacrylamide-based polymer, wherein said polyacrylamide-based polymer is not crosslinked during an injection that may occur during an EOR method, and further wherein said polyacrylamide-based polymer may not become cross-linked after injection once in a reservoir. In some embodiments, a polymer which gradually increases in charge, thereby providing for an increase in viscosity of a desired aqueous composition may result in a solution which retains its viscosity until an amount of a charged group, e.g., an anionic monomer, e.g., an acrylic acid monomer, may reach a percentage such that said solution begins to decrease in viscosity, in some instances due to the charged group resulting in the polymer adopting physical structures that result in a lowering in viscosity, e.g., curling up of a polymer due to interactions of charged groups with multivalent cations that result in self-interactions. It is to be understood, however, that the conditions of the aqueous solution and/or aqueous composition and/or aqueous environment, e.g., the salinity thereof, e.g., the composition of a brine, may effect the value at which such a change may occur. It is further noted that in some aqueous solutions and/or aqueous compositions and/or aqueous environments, such a change may not occur, i.e., the solution continues to increase in viscosity and/or the viscosity plateaus, and no decrease in viscosity is observed while the one or more polymers are present. Furthermore, the composition of the one or more polymers may further affect the value, if any, at which a transition may or may not occur. In some embodiments, a polymer which gradually increases in charge, thereby providing for an increase in viscosity of a desired aqueous composition may undergo hydrolysis reactions that hydrolyze certain groups comprised by said polymer, e.g., acrylamide groups, to a charged group, e.g., anionically charged group, e.g., acrylic acid group.

As used herein, the term "labile monomer units" generally refers to a monomer unit comprised by a polymer which may have side chains that are attached with a bond that can break or be hydrolyzed in specific aqueous environments, e.g., sea water or aqueous environments present during a method of enhanced oil recovery, e.g., such as when the polymer comprising the labile monomer units are in an aqueous oil containing reservoir. In some embodiments, a labile monomer unit may be an —NH2 group of an acrylamide monomer. Examples of labile monomer units include, for example, (meth)acrylamides that are not originally charged, e.g., originally anionically charged, such as acrylamide, N,N-dimethylacrylamide, N-hydroxymethylacrylamide, N-hydroxyethylacrylamide, N-isopropylacrylamide, N-acryloylmorpholine, N-acryloyl pyrrolidine, methacrylamide, N,N-dimethylmethacrylamide, and the like; (meth)acrylates that are not originally charged, e.g., originally anionically charged, such as methyl acrylate, hydroxyethyl acrylate, methyl methacrylate, hydroxyethyl methacrylate, and the like; and vinyl monomers such as N-vinylcaprolactam.

As used herein, the term "aqueous environment" generally refers to any environment which comprises and/or is characterized by the presence of water. For example, in some instances, an aqueous environment may contain sea water or other salinated water. In some instances, an aqueous environment may contain inorganic salts. Furthermore, in some instances, an aqueous environment may be an oil containing aqueous environment and/or an oil or gas reservoir. In some instances, an aqueous environment may comprise one or more solutions that are used during and/or as a part of enhanced oil recovery, such as chemical enhanced oil recovery, e.g., one or more polymer floods. In some instances, an aqueous environment may have a temperature of about 55° C. or less, 55° C. or more, 60° C. or more, 65° C. or more, 70° C. or more, 80° C. or more, 85° C. or more, 90° C. or more, 95° C. or more, 100° C. or more, 125° C. or more, 140° C. or more, or 150° C. or more.

As used herein, the terms "% charge", "percent charge", and the like, generally refer to the mole percent (mol %) of all charged monomer units, e.g., all anionic and cationic monomer units, such as those comprised by one or more polymers.

Methods and Compositions

Disclosed herein are methods and compositions for enhanced oil recovery, such as chemical enhanced oil recovery and/or enhanced oil recovery which comprises polymer flooding, wherein said methods and compositions comprise one or more polymers which gradually increase in charge, thereby providing for an increase in viscosity in an aqueous solution or aqueous composition, such as when present in an aqueous environment, e.g., oil or gas reservoirs, e.g., sea water, brine, or other salinated aqueous compositions. Moreover, the present disclosure generally relates to a method of gradually increasing the viscosity in a desired aqueous environment which method comprises introducing one or more polymers into said desired aqueous environment, which one or more polymers when introduced into said desired aqueous environment comprise low charge or no charge, and low viscosity and further comprise labile monomer units, wherein said one or more of said polymers when present for prolonged duration in the desired aqueous environment gradually increase in charge, thereby providing for an increase in viscosity in said desired aqueous environment, as a result of the labile monomer units in said one or more polymers being broken or hydrolyzed after being present for prolonged duration in the desired aqueous environment. In some embodiments, said aqueous environment may contain inorganic salts, and/or said aqueous environment may comprise sea water. In some embodiments, at least one of said one or more polymers may have an initial anionic charge of less than 25 mole percent. In some embodiments, at least one of said one or more polymers may contain 1-100 mole percent of labile monomer units, which gradually break or hydrolyze in the desired aqueous environment, e.g., wherein said breaking or hydrolysis of said labile monomer units may result in a gradual increase in anionic charge and viscosity in the aqueous environment. In some embodiments, at least one of said one or more polymers may contain 1-100 mole percent of acrylamide. In some embodiments, at least one of said one or more polymers may not be cross-linked when introduced into the aqueous environment. In some embodiments, at least one of said one or more polymers may not be cross-linked when introduced into the aqueous environment and further do not become cross-linked in the aqueous environment. In some embodiments, the desired aqueous environment may comprise an oil or gas reservoir.

In some embodiments, a method for enhanced oil recovery comprises the use of one or more polymers which gradually increase in charge, thereby providing for an increase in viscosity in an aqueous solution or aqueous composition present in the desired aqueous environment. In some embodiments, said method comprises introducing into an oil or gas reservoir a polymer flood comprising said one or more polymers which include polymers which gradually increase in charge, thereby providing for an increase in viscosity of an aqueous solution or aqueous composition present in the desired aqueous environment, over time when present in the oil or gas reservoir, which increase in charge and viscosity provides for an increase in oil or gas recovery from said oil or gas reservoir. In some embodiments, at least one of said one or more polymers when introduced into said oil or gas reservoir may provide for improved oil or gas recovery compared to a copolymer of acrylamide and acrylic acid comprising 70 mol % acrylamide and 30 mol % acrylic acid, such as HPAM-30, wherein the initial viscosity measurements, e.g., at injection, are the same value for said one or more polymers and said copolymer of acrylamide and acrylic acid. In some embodiments, at least one of said one or more polymers which gradually increase in charge, thereby providing for an increase in viscosity in an aqueous solution or aqueous composition, when present in a desired aqueous environment may comprise acrylamide monomers. In some embodiments, at least one of said one or more polymers which gradually increase in charge, thereby providing for an increase in viscosity in an aqueous solution or aqueous composition may comprise anionic monomers, such as acrylic acid monomers. In some embodiments, at least one of said one or more polymers which gradually increase in charge, thereby providing for an increase in viscosity in an aqueous solution or aqueous composition when present in a desired aqueous environment may comprise ATBS. In some embodiments, at least one of said one or more polymers which gradually increase in charge, thereby providing for an increase in viscosity in an aqueous solution or aqueous composition when present in an aqueous environment may comprise one or more sulfonic acid monomers, e.g., one or more ATBS, vinylsulfonic acid; 4-styrenesulfonic acid; and any salts of any of the aforementioned monomers. In some embodiments, at least one of said one or more polymers which gradually increase in charge, thereby providing for an increase in viscosity in an aqueous solution or aqueous composition when present in a desired aqueous environment may comprise acrylamide monomers and anionic monomers. In some embodiments, at least one of said one or more polymers which gradually increase in charge, thereby providing for an increase in viscosity in an aqueous solution or aqueous composition when present in a desired aqueous environment may comprise acrylamide monomers and acrylic acid monomers. In some embodiments, at least one of said one or more polymers which gradually increase in charge, thereby providing for an increase in viscosity in an aqueous solution or aqueous composition, when present in a desired aqueous environment, may comprise a water soluble polymer, wherein said water soluble polymer comprises labile monomer units comprising bonds that may be broken, and wherein breaking of said bonds may result in an increase in anionic charge. In some embodiments, at least one of said one or more polymers which gradually increase in charge, thereby providing for an increase in viscosity in an aqueous solution or aqueous composition, when present in a desired aqueous environment, may comprise one or more labile monomer units, such as, for example, one or more (meth)acrylamides that are not originally charged, e.g., originally anionically charged, such as acrylamide, N,N-dimethylacrylamide, N-hydroxymethylacrylamide, N-hydroxyethylacrylamide, N-isopropylacrylamide, N-acryloylmorpholine, N-acryloyl pyrrolidine, methacrylamide, N,N-dimethylmethacrylamide, and the like; one or more (meth)acrylates that are not originally charged, e.g., originally anionically charged, such as methyl acrylate, hydroxyethyl acrylate, methyl methacrylate, hydroxyethyl methacrylate, and the like; and one or more vinyl monomers such as N-vinylcaprolactam. In some embodiments, at least one of said one or more polymers which gradually increase in charge, thereby providing for an increase in viscosity in an aqueous solution or aqueous composition when present in a desired aqueous environment may comprise acrylamide monomers and ATBS monomers. In some embodiments, at least one of said one or more polymers which gradually increase in charge, thereby providing for an increase in viscosity in an aqueous solution or aqueous composition when present in an aqueous environment may comprise acrylamide and/or acrylic acid. In some embodiments, the percentage of acrylamide in at least one of said one or more polymers which gradually increase in charge, thereby providing for an increase in viscosity in an aqueous solution or aqueous composition when present in a desired aqueous environment may comprise 1% or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, the percentage of acrylic acid in at least one of said one or more polymers which gradually increase in charge, thereby providing for an increase in viscosity in an aqueous solution or aqueous composition when present in a desired aqueous environment may comprise 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, at least one of said one or more polymers which gradually increase in charge, thereby providing for an increase in viscosity in an aqueous solution or aqueous composition when present in a desired aqueous environment may comprise acrylic acid, and the percentage of acrylic acid in said polymer comprises 30 mol % or less, 25 mol % or less, 20 mol % or less, 15 mol % or less, 10 mol % or less, 5 mol % or less, or 1 mol % or less. In some embodiments, at least one of said one or more polymers which gradually increase in charge, thereby providing for an increase in viscosity in an aqueous solution or aqueous composition when present in a desired aqueous environment may comprise one or more sulfonated PAMs. In some embodiments, at least one of said one or more polymers which gradually increase in charge, thereby providing for an increase in viscosity in an aqueous solution or aqueous composition when present in a desired aqueous environment may comprise acrylamide and ATBS. In some embodiments, the percentage of acrylamide in said polymer may comprise 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, or 99 mol % or more. In some embodiments, the percentage of ATBS in at least one of said one or more polymers which gradually increase in charge, thereby providing for an increase in viscosity in an aqueous solution or aqueous composition when present in a desired aqueous environment may comprise 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, at least one of said one or more polymers which gradually increase in charge, thereby providing for an increase in viscosity in an aqueous solution or aqueous composition when present in a desired aqueous environment may comprise 5 mol % acrylic acid and 95 mol % acrylamide. In some embodiments, at least one of said one or more polymers which gradually increase in charge, thereby providing for an increase in viscosity in an aqueous solution or aqueous composition when present in a desired aqueous environment may comprise 15 mol % ATBS and 85 mol % acrylamide. In some embodiments, at least one of said one or more polymers which gradually increase in charge, thereby providing for an increase in viscosity in an aqueous solution or aqueous composition when present in a desired aqueous environment may comprise 1 mol % or less, 1 mol % or more, 10 mol % or more, 25 mol % or more, 50 mol % or more, 75 mol % or more, 99 mol % or more, or 100 mol % of labile monomer units. In some embodiments, at least one of said one or more polymers which gradually increase in charge, thereby providing for an increase in viscosity in an aqueous solution or aqueous composition when present in a desired aqueous environment may comprise a polyacrylamide-based polymer, wherein said polyacrylamide-based polymer is not crosslinked during an injection that may occur during an EOR method, and further wherein said polyacrylamide-based polymer may not become cross-linked after injection once in a reservoir. In some embodiments, at least one of said one or more polymers which gradually increase in charge, thereby providing for an increase in viscosity in an aqueous solution or aqueous composition when present in an aqueous environment may comprise no charge, e.g., no anionic monomers, prior to use in an EOR method, e.g., prior to injection into a formation. In some embodiments, at least one of said one or more polymers which gradually increase in charge, thereby providing for an increase in viscosity in an aqueous solution or aqueous composition when present in an aqueous environment may comprise 1% or less, 2.5% or less, 5.0% or less, 7.5% or less, 10% or less, 12.5% or less, 15.0% or less, 17.5% or less, 20% or less, 22.5% or less, 25.0% or less, 27.5% or less, 30.0% or less, 35.0% or less, 40.0% or less, 45.0% or less, 50.0% or less, 55.0% or less, 60.0% or less, 65.0% or less, 70.0% or less, 75.0% or less, 80.0% or less, 85.0% or less, 90.0% or less, 95.0% or less, 99.0% or less, 99.0% or more, or 100% charge, e.g., percent anionic monomer, e.g., percent acrylic acid monomers, e.g., wherein said one or more polymers comprise 30 mol % anionic monomers which provide for the 30% charge, or wherein said one or more polymers comprise 40 mol % anionic monomers which provide for the 40% charge . . . etc., prior to use in an EOR method, e.g., prior to injection into a formation, e.g., prior to use in a polymer flood. The chosen percent charge of the polymers may be varied dependent upon the nature of the particular aqueous environment, e.g., its starting viscosity.

In some embodiments, a method for EOR may comprise use of one or more polymers which gradually increase in charge, thereby providing for an increase in viscosity in an aqueous solution or aqueous composition, such as when present in a desired aqueous environment, and at least one of said polymers may increase in charge during the EOR method relative to its initial charge, i.e., its charge prior to use in said EOR method. For example, in some instances, said polymer may be used as a part of a polymer flood and/or may be injected downhole into a reservoir and/or formation, and said polymer may increase in charge after said polymer is introduced into a reservoir and/or formation, such as introduced as a part of a polymer flood. In some embodiments, at least one of said one or more polymers which gradually increase in charge, thereby providing for an increase in viscosity in an aqueous solution or aqueous composition present in a desired aqueous environment may increase viscosity after the onset of a polymer flood. In some instances, the change in charge may be a result of a hydrolysis reaction, wherein, sometimes, the hydrolysis reaction may convert a labile monomer unit into a charged group, e.g., an anionically charged group, e.g., an acrylic acid monomer. In some embodiments, the charge of one or more polymers which gradually increase in charge, thereby providing for an increase in viscosity in an aqueous solution or aqueous composition, when present in the aqueous environment, may increase to a value of 1% or less, 2.5% or less, 5.0% or less, 7.5% or less, 10% or less, 12.5% or less, 15.0% or less, 17.5% or less, 20% or less, 22.5% or less, 25.0% or less, 27.5% or less, 30.0% or less, 35.0% or less, 40.0% or less, 45.0% or less, 50.0% or less, 55.0% or less, 60.0% or less, 65.0% or less, 70.0% or less, 75.0% or less, 80.0% or less, 85.0% or less, 90.0% or less, 95.0% or less, 99.0% or less, 99.0% or more, or 100%. In some embodiments, said increase in charge may comprise an increase in anionic charge. In some embodiments, an increase in charge in at least one of said one or more polymers which gradually increase in charge, thereby providing for an increase in viscosity in an aqueous solution or aqueous composition may result from labile monomer units within the structures of said one or more polymers breaking after introduction of said one or more polymers into a structure and/or formation and/or reservoir.

In some embodiments, an increase in charge of at least one of said one or more polymers which gradually increase in charge, thereby providing for an increase in viscosity in an aqueous solution or aqueous composition may result in a corresponding increase in viscosity up until a threshold charge level, e.g., in some instances around 30% or less or in some instances can increase in charge up to 100%. It is to be understood that the increase in charge value which increase results in an increase in viscosity may vary based on the polymer or polymers used, the dosage amount, and/or the conditions of the EOR process, e.g., conditions of a polymer flood. Furthermore, it is to be understood, however, that the conditions of the aqueous solution and/or aqueous composition and/or aqueous environment, e.g., the salinity thereof, e.g., the composition of a brine, may effect the value at which such a change may occur. It is further noted that in some aqueous solutions or aqueous compositions, such a change may not occur, i.e., the solution continues to increase in viscosity and/or the viscosity plateaus, and no decrease in viscosity is observed while the one or more polymers are present.

In some embodiments, a method of EOR may comprise the use of one or more polymers which may gradually increase in charge, thereby providing for an increase in viscosity in an aqueous solution or aqueous composition, e.g., during a polymer flood, wherein the use of at least one of said one or more polymers may result in an increase in oil production relative to methods in which said one or more polymers which gradually increase in charge, thereby providing for an increase in viscosity in an aqueous solution or aqueous composition are not used. For example, methods of EOR comprising the use of one or more polymers which gradually increase in charge, thereby providing for an increase in viscosity in an aqueous solution or aqueous composition may result in a 1% increase or less, 1% increase or more, 2% increase or more, a 3% increase or more, a 5% increase or more, a 5.0% increase or more, a 6% increase or more, a 7% increase or more, an 8% increase or more, a 9% increase or more, a 10% increase or more, an 11% increase or more, a 12% increase or more, a 13% increase or more, a 14% increase or more, or 15% increase or more in oil production as compared to a method of EOR not comprising use of said one or more polymers which gradually increase in charge, thereby providing for an increase in viscosity in an aqueous solution or aqueous composition. Such determinations of increase in oil production efficiency may be obtained, for example, by simulations modeling EOR processes. Said polymers may comprise any one of the one or more polymers which gradually increase in charge, thereby providing for an increase in viscosity in an aqueous solution or aqueous composition as discussed herein, e.g., one or more sulfonated PAMS, e.g., one or more polymers comprising acrylamide and/or acrylic acid monomers.

In some embodiments, a method of EOR may comprise the use of one or more polymers which gradually increase in charge, thereby providing for an increase in viscosity in an aqueous solution or aqueous composition, e.g., during a polymer flood, wherein the use of at least one of said one or more polymers may result in improved sweep efficiency as compared to a method of EOR which did not comprise use of said one or more polymers which gradually increase in charge, thereby providing for an increase in viscosity in an aqueous solution or aqueous composition.

In some embodiments, a method of EOR may comprise the use of one or more polymers which gradually increase in charge, thereby providing for an increase in viscosity in an aqueous solution or aqueous composition when present in a desired aqueous environment, e.g., during a polymer flood, wherein said one or more polymers may result in a solution that retains at least 80% of its initial viscosity value, e.g., pre-injection viscosity value, for 20 months or less, 20 months or more, 23 months or more, 25 months or more, 30 months or more, 35 months or more, 40 months or more, 45 months or more, 50 months or more, 55 months or more, 60 months or more, 65 months or more, 70 months or more, 75 months or more, 80 months or more, 85 months or more, 90 months or more, or 95 months or more. In some embodiments, such durations of viscosity retention may be obtained in a composition comprising seawater or a seawater like solution or other salinated water, having a temperature ranging from about 55-140° C., e.g., a temperature of about 58° C. In some embodiments, a method of EOR may comprise the use of one or more polymers which gradually increase in charge, thereby providing for an increase in viscosity in an aqueous solution or aqueous composition when present in a desired aqueous environment, e.g., during a polymer flood, wherein said one or more polymers may result in a solution that retains at least 80% of its initial viscosity value, e.g., pre-idjection viscosity value, for their retention time in a reservoir and/or formation and/or structure.

In some embodiments, a method of EOR may comprise the use of one or more polymers which gradually increase in charge, thereby providing for an increase in viscosity in an aqueous solution or aqueous composition when present in a desired aqueous environment, e.g., during a polymer flood, and use of said one or more polymers may result in a desirable injection pressure value. For example, the pressure that may be generated near an injection well-bore area may be of a desirable value as a result of practicing a method comprising use of said one or more polymers which gradually increase in charge, thereby providing for an increase in viscosity in an aqueous solution or aqueous composition when present in a desired aqueous environment. In some embodiments, a method of EOR comprising the use of one or more polymers which gradually increase in charge, thereby providing for an increase in viscosity in an aqueous solution or aqueous composition when present in a desired aqueous environment, e.g., during a polymer flood, may result in a reduction of injection pressure by about 5% or less, about 5% or more, about 10% or more, about 20% or more, about 30% or more, about 40% or more, about 50% or more, as compared to a method not comprising use of said one or more polymers which gradually increase in charge, thereby providing for an increase in viscosity in an aqueous solution or aqueous composition, or as compared to a method comprising use of HPAM-30.

In some embodiments, a method of EOR may comprise the use of one or more polymers which gradually increase in charge, thereby providing for an increase in viscosity in an aqueous solution or aqueous composition when present in a desired aqueous environment, e.g., during a polymer flood, wherein said one or more polymers may provide for an increase in viscosity by about 1% or less, 1% or more, 5% or more, 10% or more, 15% or more, 20% or more, 25% or more, 30% or more, 35% or more, 40% or more, or 45% or more following their injection into a structure and/or formation, in some instances as part of a polymer flood that may be used during EOR.

In some embodiments, method of enhanced oil recovery comprising the use of one or more polymers which gradually increase in charge, thereby providing for an increase in viscosity in an aqueous solution or aqueous composition when present in an oil containing aqueous environment, wherein said method comprises: (i) obtaining or providing a composition comprising one or more polymers which gradually increase in charge, thereby providing for an increase in viscosity in an aqueous solution or aqueous composition when present in a desired aqueous environment, e.g., as described herein; (ii) placing the composition in a subterranean formation downhole; and (iii) extracting material comprising petroleum from the subterranean formation downhole via a production wellbore. In some embodiments, said one or more polymers which gradually increase in charge, thereby providing for an increase in viscosity in an aqueous solution or aqueous composition may increase in viscosity once being placed in said subterranean formation downhole. In some embodiments, said method may comprise use of a fluid conduit disposed in an injection wellbore, and/or a pump configured to pump the composition through a conduit downhole. In some embodiments, a method of enhanced oil recovery comprising the use of one or more polymers which gradually increase in charge, thereby providing for an increase in viscosity in an aqueous solution or aqueous composition when present in an oil containing aqueous environment, wherein said method comprises: (i) obtaining or providing a composition comprising one or more polymers which gradually increase in charge, thereby providing for an increase in viscosity in an aqueous solution or aqueous composition when present in an oil containing aqueous environment; (ii) placing the composition in a subterranean formation downhole; and (iii) extracting material comprising petroleum from the subterranean formation downhole via a production wellbore. In some embodiments, said one or more polymers may increase in viscosity once being placed in said subterranean formation downhole. In some embodiments, during said method, the composition comprising said one or more polymers may be placed downhole via an injection wellbore. In some embodiments of said method, extraction may be effected using a production wellbore. In some embodiments of a method comprising use of the one or more polymers which gradually increase in charge, thereby providing for an increase in viscosity in an aqueous solution or aqueous composition, a composition comprising said one or more polymers may be placed in the subterranean formation downhole, which comprises placing the composition in a producing zone downhole, and wherein the extraction of material comprising petroleum from the subterranean formation downhole comprises extracting of the material from the producing zone.

In some embodiments, a method of EOR may comprise the use of one or more polymers which gradually increase in charge, thereby providing for an increase in viscosity in an aqueous solution or aqueous composition when present in an oil containing aqueous environment, e.g., during a polymer flood, wherein said one or more polymers begin to increase in viscosity during said EOR method, e.g., during a polymer flood, e.g., after injection. In some embodiments, the temperature of the formation, reservoir, structure, and the like, into which one or more polymers which gradually increase in charge, thereby providing for an increase in viscosity in an aqueous solution or aqueous composition may be introduced may be about 55° C. or less, 55° C. or more, 60° C. or more, 65° C. or more, 70° C. or more, 80° C. or more, 85° C. or more, 90° C. or more, 95° C. or more, 100° C. or more, 125° C. or more, or 150° C. or more. In some embodiments, an increase in temperature that said one or more polymers may encounter following introduction may result in corresponding increase in the rate at which charge of said one or more polymers begins to increase, e.g., begins to increase as a result of a hydrolysis reaction. In some embodiments, a method of EOR may comprise the use of one or more polymers which gradually increase in viscosity when present in an aqueous environment, e.g., during a polymer flood, wherein said one or more polymers are comprised by a solution and/or are in solution form. In some instances, said solution may comprise brine, seawater, and/or salts.

In some embodiments, a method of EOR may comprise the use of one or more polymers which gradually increase in viscosity when present in an aqueous environment, e.g., during a polymer flood, wherein the dose of at least one of said one or more polymers that is used is any dose that results in a desired effect. In some embodiments, said dose may be about 100 ppm or less, 200 ppm or less, 300 ppm or less, 400 ppm or less, 500 ppm or less, 750 ppm or less, 1000 ppm or less, 2000 ppm or less, 3000 ppm or less, 4000 ppm or less, 5000 ppm or less, 6000 ppm or less, 7000 ppm or less, 8000 ppm or less, 9000 ppm or less, 10,000 ppm or less, or 10,000 ppm or more.

Moreover, the present disclosure generally relates to a composition suitable for use in EOR, such as, for example, a polymer flood, wherein said composition comprises one or more polymers which gradually increase in charge, thereby providing for an increase in viscosity in an aqueous solution or aqueous composition when present in an oil containing aqueous environment and an aqueous fluid. In some embodiments, said composition may be suitable for use in polymer flooding. In some embodiments, at least one of said one or more polymers which gradually increase in charge, thereby providing for an increase in viscosity in an aqueous solution or aqueous composition when present in an oil containing aqueous environment may comprise acrylamide monomers. In some embodiments, at least one of said one or more polymers which gradually increase in charge, thereby providing for an increase in viscosity in an aqueous solution or aqueous composition when present in an oil containing aqueous environment may comprise anionic monomers, such as acrylic acid monomers. In some embodiments, at least one of said one or more polymers which gradually increase in charge, thereby providing for an increase in viscosity in an aqueous solution or aqueous composition when present in an oil containing aqueous environment may comprise ATBS. In some embodiments, at least one of said one or more polymers which gradually increase in charge, thereby providing for an increase in viscosity in an aqueous solution or aqueous composition when present in a desired aqueous environment may comprise one or more sulfonic acid monomers, e.g., one or more ATBS, vinylsulfonic acid; 4-styrenesulfonic acid; and any salts of any of the aforementioned monomers. In some embodiments, at least one of said one or more polymers which gradually increase in charge, thereby providing for an increase in viscosity in an aqueous solution or aqueous composition when present in an oil containing aqueous environment may comprise acrylamide monomers and anionic monomers. In some embodiments, at least one of said one or more polymers which gradually increase in charge, thereby providing for an increase in viscosity in an aqueous solution or aqueous composition when present in an oil containing aqueous environment may comprise acrylamide monomers and acrylic acid monomers. In some embodiments, at least one of said one or more polymers which gradually increase in charge, thereby providing for an increase in viscosity in an aqueous solution or aqueous composition when present in an oil containing aqueous environment may comprise acrylamide monomers and ATBS monomers. In some embodiments, at least one of said one or more polymers which gradually increase in charge, thereby providing for an increase in viscosity in an aqueous solution or aqueous composition when present in an oil containing aqueous environment may comprise acrylamide and/or acrylic acid. In some embodiments, the percentage of acrylamide at least one of said one or more polymers which gradually increase in charge, thereby providing for an increase in viscosity in an aqueous solution or aqueous composition when present in an oil containing aqueous environment comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, the percentage of acrylic acid in at least one of said one or more polymers which gradually increase in charge, thereby providing for an increase in viscosity in an aqueous solution or aqueous composition when present in an oil containing aqueous environment comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, at least one of said one or more polymers which gradually increase in charge, thereby providing for an increase in viscosity in an aqueous solution or aqueous composition when present in an oil containing aqueous environment may comprise acrylic acid, and the percentage of acrylic acid in the polymer comprises 30 mol % or less, 25 mol % or less, 20 mol % or less, 15 mol % or less, 10 mol % or less, 5 mol % or less, or 1 mol % or less. In some embodiments, at least one of said one or more polymers which gradually increase in charge, thereby providing for an increase in viscosity in an aqueous solution or aqueous composition when present in an oil containing aqueous environment may comprise a sulfonated PAM. In some embodiments, at least one of said one or more polymers which gradually increase in charge, thereby providing for an increase in viscosity in an aqueous solution or aqueous composition when present in an oil containing aqueous environment may comprise acrylamide and ATBS. In some embodiments, at least one of said one or more polymers which gradually increase in charge, thereby providing for an increase in viscosity in an aqueous solution or aqueous composition may comprise a water soluble polymer, wherein said water soluble polymer comprises labile monomer units comprising bonds that may be broken, and wherein breaking of said bonds may result in an increase in anionic charge. In some embodiments, at least one of said one or more polymers which gradually increase in charge, thereby providing for an increase in viscosity in an aqueous solution or aqueous composition may comprise one or more labile monomer units, such as, for example, one or more (meth)acrylamides that are not originally charged, e.g., originally anionically charged, such as acrylamide, N,N-dimethylacrylamide, N-hydroxymethylacrylamide, N-hydroxyethylacrylamide, N-isopropylacrylamide, N-acryloylmorpholine, N-acryloyl pyrrolidine, methacrylamide, N,N-dimethylmethacrylamide, and the like; one or more (meth)acrylates that are not originally charged, e.g., originally anionically charged, such as methyl acrylate, hydroxyethyl acrylate, methyl methacrylate, hydroxyethyl methacrylate, and the like; and one or more vinyl monomers such as N-vinylcaprolactam. In some embodiments, the percentage of acrylamide in at least one of said one or more polymers which gradually increase in charge, thereby providing for an increase in viscosity in an aqueous solution or aqueous composition when present in an oil containing aqueous environment comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, or 99 mol % or more. In some embodiments, the percentage of ATBS in at least one of said one or more polymers which gradually increase in charge, thereby providing for an increase in viscosity in an aqueous solution or aqueous composition when present in an oil containing aqueous environment comprises 1 mol % or less, 1 mol % or more, 10 mol % or more, 20 mol % or more, 30 mol % or more, 40 mol % or more, 50 mol % or more, 60 mol % or more, 70 mol % or more, 80 mol % or more, 90 mol % or more, 99 mol % or more, or 100 mol %. In some embodiments, at least one of said one or more polymers which gradually increase in charge, thereby providing for an increase in viscosity in an aqueous solution or aqueous composition when present in an oil containing aqueous environment may comprise 5 mol % acrylic acid and 95 mol % acrylamide. In some embodiments, at least one of said one or more polymers which gradually increase in charge, thereby providing for an increase in viscosity in an aqueous solution or aqueous composition when present in an oil containing aqueous environment may comprise 15 mol % ATBS and 85 mol % acrylamide. In some embodiments, at least one of said one or more polymers which gradually increase in charge, thereby providing for an increase in viscosity in an aqueous solution or aqueous composition when present in an oil containing aqueous environment may comprise 1 mol % or less, 1 mol % or more, 10 mol % or more, 25 mol % or more, 50 mol % or more, 75 mol % or more, 99 mol % or more, or 100 mol % of labile monomer units. In some embodiments, at least one of said one or more polymers which gradually increase in charge, thereby providing for an increase in viscosity in an aqueous solution or aqueous composition when present in an oil containing aqueous environment may comprise a polyacrylamide-based polymer, wherein said polyacrylamide-based polymer is not crosslinked during an injection that may occur during EOR, and further wherein said polyacrylamide-based polymer may not become cross-linked after injection once in a formation and/or structure and/or reservoir. In some embodiments, at least one of said one or more polymers which gradually increase in charge, thereby providing for an increase in viscosity in an aqueous solution or aqueous composition when present in an oil containing aqueous environment may comprise no charge, e.g., no anionic monomers, prior to use in an EOR method, e.g., prior to injection into a formation and/or reservoir and/or structure. In some embodiments, at least one of said one or more polymers which gradually increase in charge, thereby providing for an increase in viscosity in an aqueous solution or aqueous composition when present in an oil containing aqueous environment may comprise 1% or less, 2.5% or less, 5.0% or less, 7.5% or less, 10% or less, 12.5% or less, 15.0% or less, 17.5% or less, 20% or less, 22.5% or less, 25.0% or less, 27.5% or less, 30.0% or less, 35.0% or less, 40.0% or less, 45.0% or less, 50.0% or less, 55.0% or less, 60.0% or less, 65.0% or less, 70.0% or less, 75.0% or less, 80.0% or less, 85.0% or less, 90.0% or less, 95.0% or less, 99.0% or less, 99.0% or more, or 100% charge, e.g., percent anionic monomer, e.g., percent acrylic acid monomers, e.g., wherein said one or more polymers comprise 30 mol % anionic monomers which provide for the 30% charge or wherein said one or more polymers comprise 40 mol % anionic monomers which provide for the 40% charge . . . etc., prior to use in an EOR method, e.g., prior to injection into a formation, e.g., prior to use in a polymer flood. As mentioned the mol % charge may vary dependent upon the nature of the desired aqueous environment, e.g., its initial viscosity.

In some embodiments, said composition comprising one or more polymers which gradually increase in charge, thereby providing for an increase in viscosity in an aqueous solution or aqueous composition when present in an oil containing aqueous environment may be placed downhole. In some embodiments, at least one of said one or more polymers may increase in charge during the EOR method relative to its initial charge, i.e., its charge prior to use in said EOR method, once said one or more polymers are placed downhole. For example, in some instances, a composition comprising one or more polymers which gradually increase in charge, thereby providing for an increase in viscosity in an aqueous solution or aqueous composition when present in an oil containing aqueous environment may be used as a part of a polymer flood and/or may be injected downhole into a formation, and said polymer may increase in charge after said polymer is introduced into a formation, such as introduced as a part of a polymer flood. In some instances, the change in charge may be a result of a hydrolysis reaction, wherein, sometimes, the hydrolysis reaction may convert a labile monomer unit into a charged group, e.g., an anionically charged group, e.g., an acrylic acid monomer. In some embodiments, the charge of said one or more polymers which gradually increase in charge, thereby providing for an increase in viscosity in an aqueous solution or aqueous composition when present in an oil containing aqueous environment may increase to a value of 1% or less, 2.5% or less, 5.0% or less, 7.5% or less, 10% or less, 12.5% or less, 15.0% or less, 17.5% or less, 20% or less, 22.5% or less, 25.0% or less, 27.5% or less, 30.0% or less, 35.0% or less, 40.0% or less, 45.0% or less, 50.0% or less, 55.0% or less, 60.0% or less, 65.0% or less, 70.0% or less, 75.0% or less, 80.0% or less, 85.0% or less, 90.0% or less, 95.0% or less, 99.0% or less, 99.0% or more, or 100% once placed downhole. In some embodiments, an increase in charge of said one or more polymers which gradually increase in charge, thereby providing for an increase in viscosity in an aqueous solution or aqueous composition when present in an oil containing aqueous environment may result from labile monomer units within the structures of said one or more polymers breaking after being placed downhole.

In some embodiments, said composition comprising one or more polymers which gradually increase in charge, thereby providing for an increase in viscosity in an aqueous solution or aqueous composition when present in an oil containing aqueous environment, may provide for an increase in viscosity by about 1% or less, 1% or more, 5% or more, 10% or more, 15% or more, 20% or more, 25% or more, 30% or more, 35% or more, 40% or more, or 45% or more once being placed downhole.

In some embodiments, said composition comprising one or more polymers which gradually increase in charge, thereby providing for an increase in viscosity in an aqueous solution or aqueous composition when present in an oil containing aqueous environment, may result in a solution that retains at least 80% of its initial viscosity value, e.g., pre-injection viscosity value, e.g., before being placed downhole, for 20 months or less, 20 months or more, 23 months or more, 25 months or more, 30 months or more, 35 months or more, 40 months or more, 45 months or more, 50 months or more, 55 months or more, 60 months or more, 65 months or more, 70 months or more, 75 months or more, 80 months or more, 85 months or more, 90 months or more, or 95 months or more. In some embodiments, said composition comprising one or more polymers which gradually increase in charge, thereby providing for an increase in viscosity in an aqueous solution or aqueous composition when present in an oil containing aqueous environment, may result in a solution that retains at least 80% of its initial viscosity value for their retention time in a reservoir. In some embodiments, said composition may comprise a greater viscosity prior to introduction to said aqueous environment as compared to the viscosity of a composition that does not comprise said one or more polymers which gradually increase in charge, thereby providing for an increase in viscosity in an aqueous solution or aqueous composition.

EXAMPLES

Example 1

Comparative Polymer Aging

In this example, the aging of two different water soluble anionic polyacrylamide-based polymer samples was compared, wherein one of said polymer samples initially comprised 30 mol % of acrylic acid (Polymer A), and the other initially comprised 5 mol % of acrylic acid (Polymer B). Both Polymer A and Polymer B were produced by gel polymerization.

Polymer solution samples were prepared as follows. The samples were prepared under anaerobic conditions inside an anaerobic chamber ($N_2$ atmosphere). Either Polymer A or Polymer B was added into deoxygenated brine under magnetic stirring to obtain a solution at 2500-3000 ppm. Mild magnetic stirring was continued overnight.

The aging performance of the two polymer samples (Polymer A and Polymer B) was evaluated in synthetic seawater. The synthetic seawater contained a total dissolved solids content of 34,800 ppm, with 400 ppm of $Ca^{2+}$, 1300 ppm $Mg^{2+}$, 2700 ppm $SO_4^{2-}$, and 400 ppm $K^+$.

Polymer aging experiments were performed as follows. The polymer solutions were placed directly into 316 stainless steel pressure cylinders. The air-tight vessels were subsequently placed into (non-inert) ovens with pre-set aging temperatures as described below. Sampling was performed within an anaerobic chamber ($N_2$ atmosphere) at scheduled time intervals. Insignificant oxygen content was verified by ampoules (CHEMets R-7540) having a detection limit of −5 ppb.

Viscosity measurements for the polymer aging experiments were taken as follows. Viscosity of the polymer solution samples was measured by Anton Paar MCR302 rheometer, utilizing double gap geometry. The measurements were done as shear rate sweeps from 0.1 l/s to 1000 l/s, and values at shear rate 7.3 $s^{-1}$ were used for comparisons. The measurement temperature was typically 25° C.

Measurements of acrylic acid content of the polymer samples were taken by $^{13}C$ NMR as follows. Before the $^{13}C$ NMR measurements, the aged samples were dialyzed in order to remove salts that were present and to adjust the pH. The following dialysis procedure was applied: 1 day against deionized water, 4 days against 10 mM PBS (phosphate) buffer at pH 7.4 (buffer solution changed daily), and finally 1 day against deionized water. If the pH is not adjusted to above 7 by dialysis against buffer, there was a risk that acrylic acid and acrylamide carbonyl peaks would not be separated in the $^{13}C$ NMR spectrum. After dialysis, the samples were freeze dried. $^{13}C$ NMR was undertaken on a Bruker 600 MHz Avance III HD equipped with a 5-mm cryogenic CP-TCI z-gradient probe. 40 mg of dried polymer sample was dissolved into 1 mL of 1:1 $D_2O:H_2O$. C131G60 pulse sequence with dl=2 s and ns=1024 was used. From the spectra, the carbonyl quaternary responses were integrated. Comparison of parallel samples yielded an error estimate of ±3 mol % for chemical group content. It was noted that this included variations induced by sample handling.

Figure 1B:
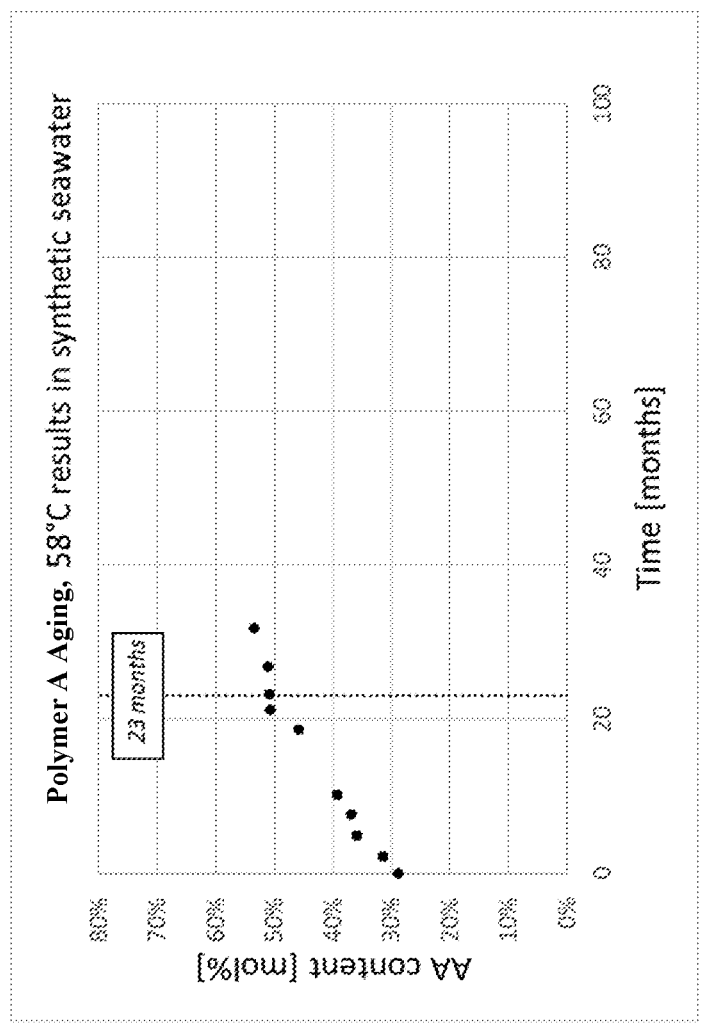

Referring now to FIG. 1A and FIG. 1B, the polymer aging results were obtained by aging a 3000 ppm sample of Polymer A at 100° C., and then calculating to a 58° C. time scale. The data of FIG. 1A demonstrated that Polymer A retained 80% of its initial viscosity value up to 23 months. The data of FIG. 1B demonstrated the rise in acrylic acid content of Polymer A that occurred over time, with the 23 month timepoint noted on the graph of FIG. 1B by the dashed line.

Figure 2A:
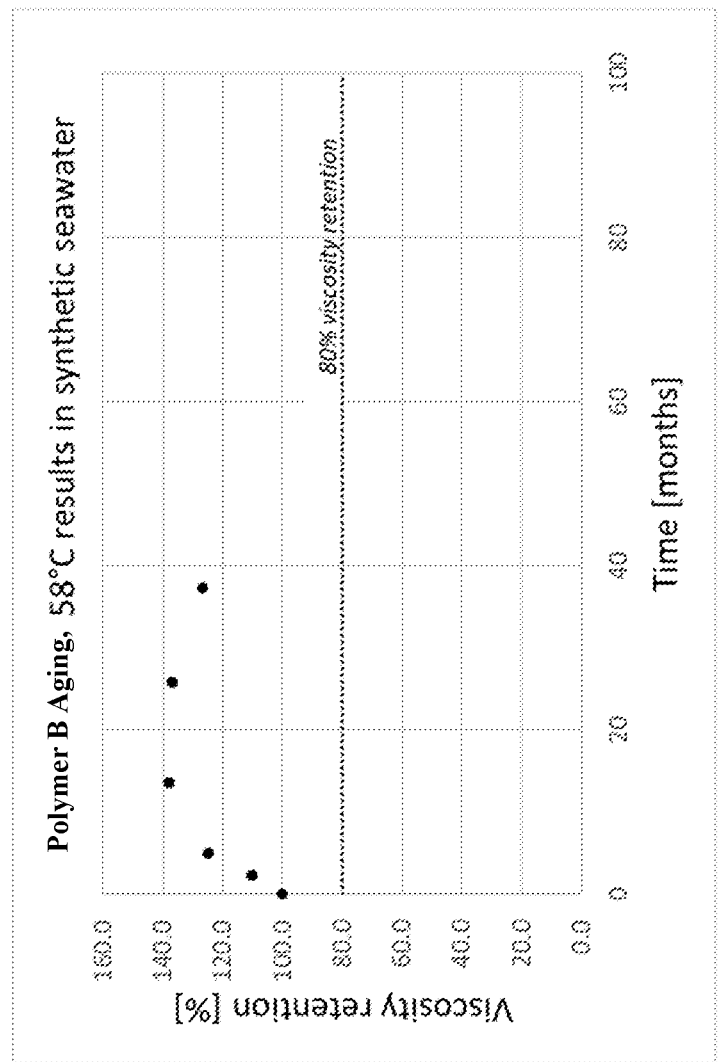
FIG. 2A and FIG. 2B illustrate the aging of a polymer in accordance with Example 1.
Figure 2B:
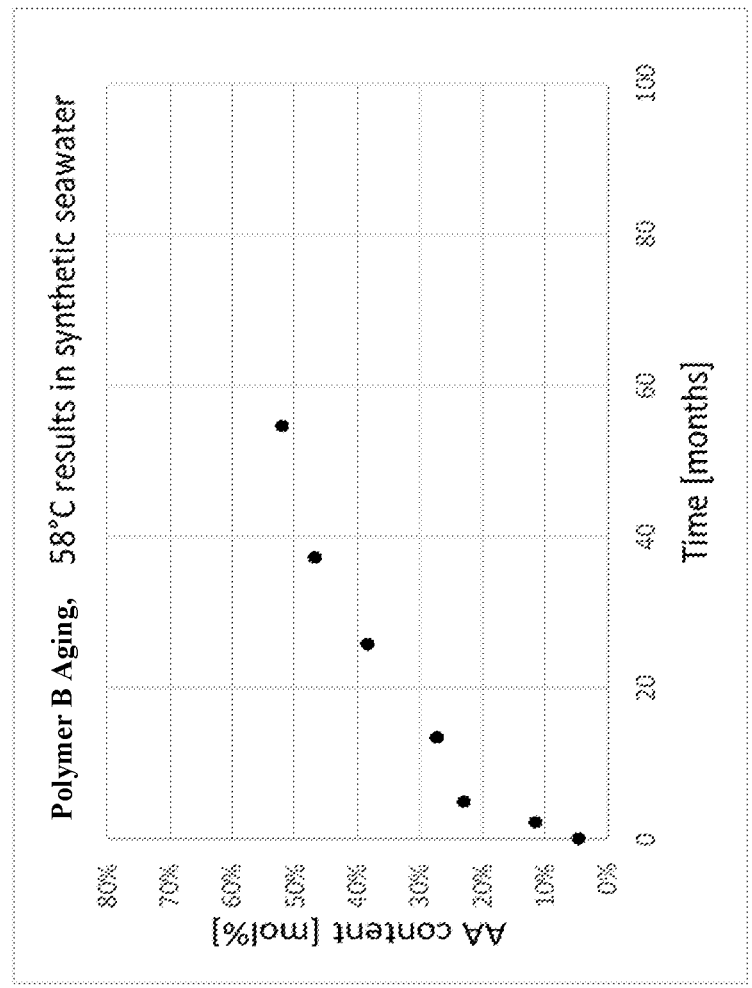

Referring now to FIG. 2A and FIG. 2B, the polymer aging results were obtained by aging a 3000 ppm sample of Polymer B at 100° C., and then calculating to a 58° C. time scale. The data of FIG. 2A demonstrated that Polymer B increased in viscosity over the first 20 months of the aging experiment and retained greater than 100% of its initial viscosity value over the time course of the experiment. The data of FIG. 2B demonstrated the rise in acrylic acid content of Polymer B that occurred over time. It was noted that once the acrylic acid content reached approximately 30% (see FIG. 2B) at approximately 20 months, the viscosity of the solution comprising Polymer B no longer increased and began to decrease slowly (see FIG. 2A). Comparing FIG. 1A and FIG. 1B with FIG. 2A and FIG. 2B demonstrated that the viscosity retention of Polymer B was greater than that of Polymer A over the time course of the aging experiments.

Example 2

Polymer Aging

In this example, the aging of a sulfonated polyacrylamide-based polymer sample ("Polymer C") was evaluated, wherein said sulfonated polyacrylamide-based polymer initially comprised 15 mol % of acrylamide tertiary butyl sulfonic acid ("ATBS"). Polymer C was produced by gel polymerization.

Preparation of a Polymer C sample followed the same protocol as described above with regard to Polymer A and Polymer B. Polymer C aging experiments and measurements were performed as described above with regard to Polymer A and Polymer B.

Figure 3A:
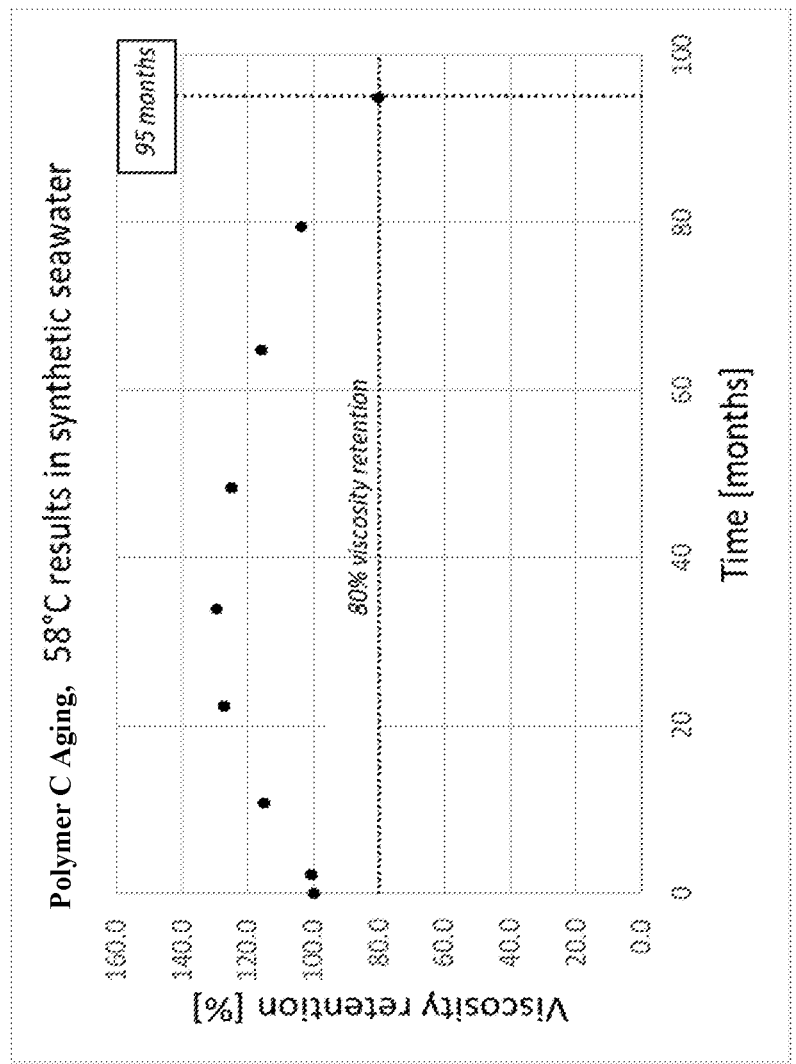
FIG. 3A and FIG. 3B illustrate the aging of a polymer in accordance with Example 2.
Figure 3B:
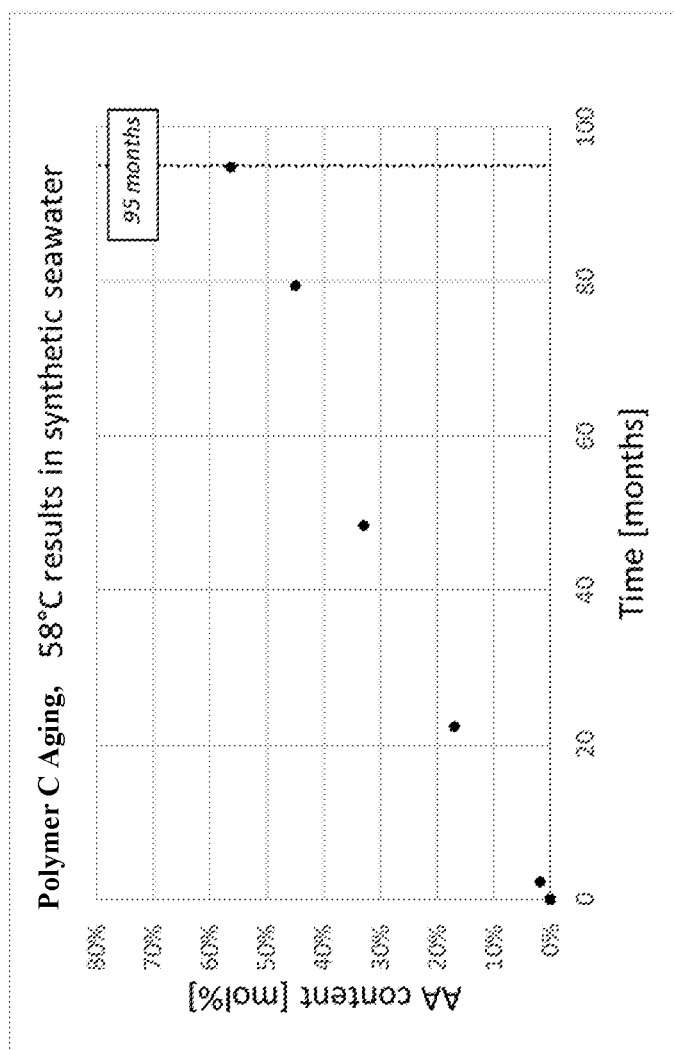

Referring now to FIG. 3A and FIG. 3B, the polymer aging results were obtained by aging a 3000 ppm sample of Polymer C at 100° C., and then calculating to a 58° C. time scale. The data of FIG. 3A demonstrated that Polymer C increased in viscosity over the first approximately 40 months of the aging experiment. The data of FIG. 3B demonstrated the rise in acrylic acid content, initially 0 mol %, that occurred over time. It was noted that once the acrylic acid content reached approximately 30% at approximately 40 months (see FIG. 3B), the viscosity of the solution comprising Polymer C no longer increased and began to slowly decrease (see FIG. 3A). It was noted that Polymer C retained at least 80% of its initial viscosity value for 95 months.

Example 3

Oil Production Efficiency

In the present Example, a simulation to measure the oil production efficiency under various different polymer flood conditions was performed. The viscosity curves obtained in Example 1 for Polymer A and Polymer B, and the viscosity curve obtained in Example 2 for Polymer C, were used as input for the reservoir modeling simulation of the instant Example. Various breakthrough times (1-5 years) were tested in the simulations that were performed. All of the samples in the simulation had the same starting viscosity (8.8 cP at 1500 ppm).

Figure 4:
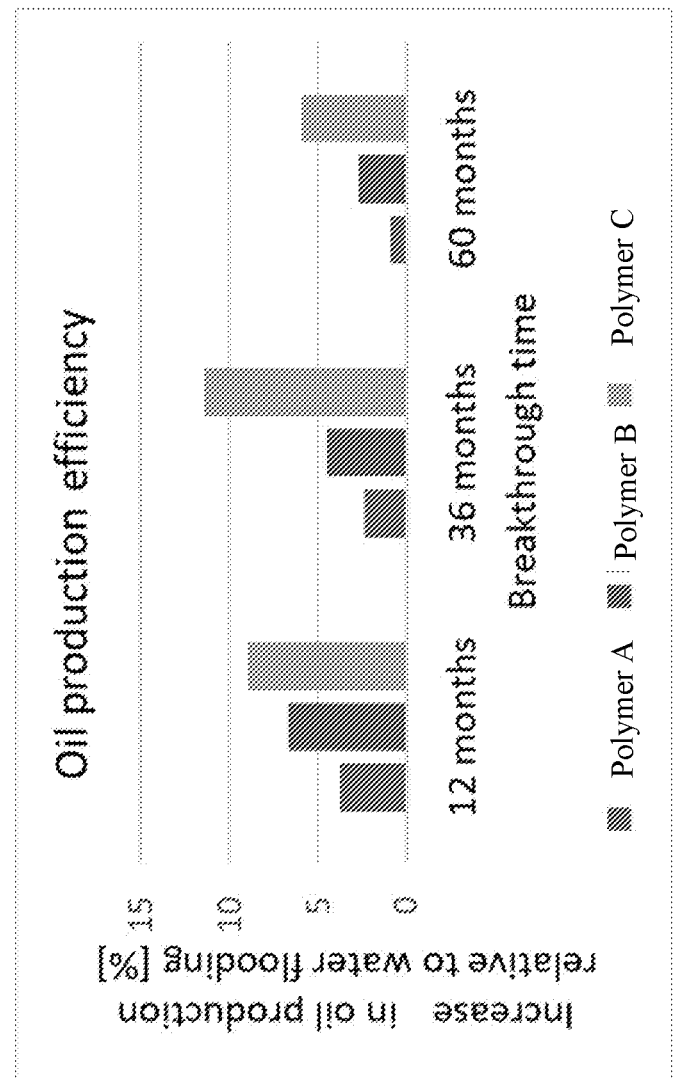
FIG. 4 illustrates oil production efficiencies under various different polymer flooding conditions as obtained by a simulation that was performed in accordance with Example 3.

Referring now to FIG. 4, the results of the simulation that was performed demonstrated a higher production efficiency for Polymer B and Polymer C as compared to Polymer A. It was noted that Polymer B and Polymer C both comprised a lower acrylic acid content as compared to Polymer A. It was further noted that Polymer C, which had 0% acrylic acid initially, and which demonstrated the longest viscosity retention, demonstrated that highest production efficiency at each breakthrough time (see FIG. 4: 12 months, 36 months, and 60 months).

In the preceding procedures, various steps have been described. It will, however, be evident that various modifications and changes may be made thereto, and additional procedures may be implemented, without departing from the broader scope of the procedures as set forth in the claims that follow.

The invention claimed is:

1. A method of increasing the viscosity in an oil or gas containing aqueous environment, which method comprises introducing at least one polymer into said oil or gas containing aqueous environment comprising a temperature of about 55-140° C., wherein said at least one polymer comprises labile monomer units, and further wherein:
    said at least one polymer comprises no charge prior to introduction into the oil or gas containing aqueous environment or has an initial anionic charge of less than 25 mole percent measured prior to introduction into the oil or gas containing aqueous environment;
    said at least one polymer is introduced into the oil or gas containing aqueous environment as an aqueous solution or aqueous composition;
    said at least one polymer is not cross-linked when introduced into the oil or gas containing aqueous environment and further does not become cross-linked in the oil or gas containing aqueous environment;
    said at least one polymer, when present in the oil or gas containing aqueous environment for a duration of 1-100 months, increases in charge over said duration, thereby providing for an increase in viscosity of said aqueous solution or aqueous composition comprising said at least one polymer which is present in said oil or gas containing aqueous environment, wherein said increase in viscosity occurs as a result of the labile monomer units in said at least one polymer breaking or hydrolyzing by reaction with water comprised in the oil or gas containing aqueous environment, thereby forming one or more carboxylates;
    said at least one polymer is introduced into the oil or gas containing aqueous environment during an enhanced oil or gas recovery process as a polymer flood; and
    whereby the resultant increase in viscosity of said aqueous solution or aqueous composition comprising said at least one polymer provides for an increase in oil or gas recovery from said oil or gas containing aqueous environment.

2. The method of claim 1, comprising at least one of the following:
    i. the oil or gas containing aqueous environment contains inorganic salts;
    ii. the oil or gas containing aqueous environment comprises sea water or other salinated water;
    iii. the oil or gas containing aqueous environment has a temperature ranging from 55° C. to 100° C.;
    iv. said at least one polymer has an initial content of anionic monomers of less than 25 mole percent;
    v. said at least one polymer comprises 1-100 mole percent of said labile monomer units which break or hydrolyze in the oil or gas containing aqueous environment;
    vi. said at least one polymer comprises 1-100 mole percent of acrylamide monomers;

vii. the oil or gas containing aqueous environment comprises an oil or gas reservoir;

viii. said at least one polymer when introduced into said oil or gas containing aqueous environment provides for improved oil or gas recovery compared to a copolymer comprising 70 mol % acrylamide and 30 mol % acrylic acid, wherein said at least one polymer comprises an initial viscosity which is the same as the viscosity of said copolymer comprising 70 mol % acrylamide and 30 mol % acrylic acid;

ix. t said at least one polymer comprises a polymer that comprises acrylamide or acrylamide-type monomers;

x. said at least one polymer comprises a polymer comprising acrylic acid monomers;

xi. said at least one polymer comprises a polymer comprising acrylamide tertiary butyl sulfonic acid ("ATBS") monomers;

xii. said at least one polymer comprises a polymer comprising acrylamide monomers and anionic monomers;

xiii. said at least one polymer comprises a polymer comprising acrylamide monomers and acrylic acid monomers;

xiv. said at least one polymer comprises a polymer comprising acrylamide monomers and ATBS monomers;

xv. said at least one polymer comprises a polymer comprising (meth)acrylamide or (meth)acrylamide-type monomers that are not anionically charged when introduced into the oil or gas containing aqueous environment;

xvi. said at least one polymer comprises a polymer comprising one or more (meth)acrylate monomers that are not anionically charged when introduced into the oil or gas containing aqueous environment;

xvii. said at least one polymer comprises a polymer that comprises one or more vinyl monomers;

xviii. said at least one polymer comprises a polymer comprising one or more monomers selected from the group consisting of:

acrylamide, N,N-dimethylacrylamide, N-hydroxymethylacrylamide, N-hydroxyethylacrylamide, N isopropylacrylamide, N-acryloylmorpholine, N-acryloyl pyrrolidine, methacrylamide, N,N-dimethylmethacrylamide, Methyl acrylate, hydroxyethyl acrylate, methyl methacrylate, hydroxyethyl methacrylate, and N-vinylcaprolactam;

xix. said at least one polymer comprises a polymer comprising 75-100 mol % of acrylamide monomers;

xx. said at least one polymer comprises a polymer comprising 0-25 mol % of acrylic acid monomers;

xxi. said at least one polymer comprises a polymer comprising sulfonated polyacrylamide monomers;

xxii. said at least one polymer comprises a polymer comprising one or more sulfonic acid monomers;

xxiii. said at least one polymer comprises a polymer comprising one or more sulfonic acid monomers selected from the group consisting of ATBS, vinylsulfonic acid, 4-styrenesulfonic acid, and salts of any of the aforementioned sulfonic acid monomers;

xxiv. said at least one polymer comprises a polymer comprising 0-25 mol % of ATBS monomers;

xxv. said at least one polymer comprises a polymer comprising 5 mol % acrylic acid and 95 mol % acrylamide monomers;

xxvi. said at least one polymer comprises a polymer comprising 15 mol % ATBS monomers and 85 mol % acrylamide monomers;

xxvii. said at least one polymer comprises a polymer comprising 1-100 mol % of labile monomer units;

xxviii. said at least one polymer comprises a polymer that comprises 0-100 mol % of anionically charged monomers prior to introduction into the oil or gas containing aqueous environment;

xxix. said at least one polymer comprises a polymer which increases in viscosity by 1-45% after introduction into the oil or gas containing aqueous environment;

xxx. said at least one polymer comprises a polymer that increases in anionic charge by 1-100 mol % after introduction into the oil or gas containing aqueous environment;

xxxi. the aqueous solution or aqueous composition comprising said at least one polymer after introduction into the oil or gas containing aqueous environment retains at least 80% of its initial viscosity for a duration of 10-95 months;

xxxii. said at least one polymer is introduced into the oil or gas containing aqueous environment at a dose ranging from 100-10,000 ppm; or xxxiii. any combination of the foregoing.

3. The method of claim 1, wherein:

i. said method of enhanced oil or gas recovery (EOR) results in a percent increase in oil production of 1-15% as compared to a method of EOR not comprising the use of said at least one polymer which increases in charge after introduction into the oil or gas containing aqueous environment;

ii. said method results in increased sweep efficiency; or iii. a combination of (i) and (ii).

4. The method of enhanced oil recovery according to claim 1 wherein (i) said at least one polymer is placed downhole in a subterranean formation comprising oil or gas.

5. The method of enhanced oil recovery according to claim 1 further comprising extracting material comprising petroleum from a subterranean formation downhole via a production wellbore after said increase in viscosity of the aqueous solution or aqueous composition comprising the at least one polymer present in the oil or gas containing aqueous environment has occurred.

6. The method of enhanced oil recovery according to claim 1 further comprising placing the aqueous solution or aqueous composition comprising said at least one polymer in an oil or gas producing zone downhole, and extracting material comprising petroleum from a subterranean formation downhole from a producing zone after said increase in viscosity of the aqueous solution or aqueous composition comprising the at least one polymer present in the oil or gas containing aqueous environment has occurred.

7. An oil or gas containing aqueous environment which comprises a composition, wherein said composition comprises an aqueous solution or aqueous composition comprising at least one polymer having no charge prior to introduction into the oil or gas containing aqueous environment or an initial anionic charge of less than 25 mol % and further comprising one or more labile monomer units, which at least one polymer is not cross-linked when introduced into the oil or gas containing aqueous environment and which at least one polymer increases in charge over a duration of 1-100 months when present in the oil or gas containing aqueous environment as a result of said one or more labile monomer units being broken or hydrolyzed by reaction with water in the oil or gas containing aqueous environment, thereby forming one or more carboxylates, thereby providing for an increase in viscosity of said aqueous solution or aqueous composition comprising said at least one polymer present in said oil or gas containing aqueous environment.

8. The oil or gas containing aqueous environment of claim 7, in which said composition comprises an aqueous solution or aqueous composition and at least one polymer, wherein:
(i) said at least one polymer comprises anionic monomers;
(ii) at said at least one polymer comprises acrylic acid monomers;
(iii) at said at least one polymer comprises ATBS monomers;
(iv) at said at least one polymer comprises acrylamide monomers and anionic monomers;
(v) at said at least one polymer comprises acrylamide monomers acrylic and acid monomers;
(vi). at said at least one polymer comprises acrylamide monomers and ATBS monomers;
(vii). said at least one polymer comprises a polymer that comprises 1-100 mol % of acrylamide monomers;
(viii). said at least one polymer comprises a polymer that comprises 0-2.5 mol % of acrylic acid monomers;
(ix). said at least one polymer comprises a polymer that comprises sulfonated polyacrylamide monomers;
(x). said at least one polymer comprises a polymer that comprises one or more sulfonic acid monomers selected from the group consisting of ATBS, vinylsulfonic acid, 4-styrenesulfonic acid, and salts of any of the aforementioned sulfonic acid monomers;
(xi). said at least one polymer comprises a polymer that comprises 0-25 mol % ATBS monomers;
(xii). said at least one polymer comprises a polymer that comprises 5 mol % acrylic acid and 95 mol % acrylamide monomers;
(xiii). said at least one polymer comprises a polymer that comprises 15 mol % ATBS and 85 mol % acrylamide monomers;
(xiv). said at least one polymer comprises a polymer that comprises 1-100 mol % of labile monomer units;
(xv). said at least one polymer comprises a polymer that comprises no charge when introduced into the oil or gas containing aqueous environment;
(xvi). said at least one polymer comprises a polymer which increases in charge by forming 1-100 mol % of anionically charged monomers after introduction into the oil or gas containing aqueous environment;
(xvii). said at least one polymer comprises a polymer that increases in viscosity by of 1-45% after introduction into the oil or gas containing aqueous environment;
(xviii). said at least one polymer comprises a polymer when present in said oil or gas containing aqueous environment retains at least 80% of its initial viscosity for a duration of 10-95 months; or
(xx) any combination of the foregoing.

* * * * *